Patented Mar. 27, 1923.

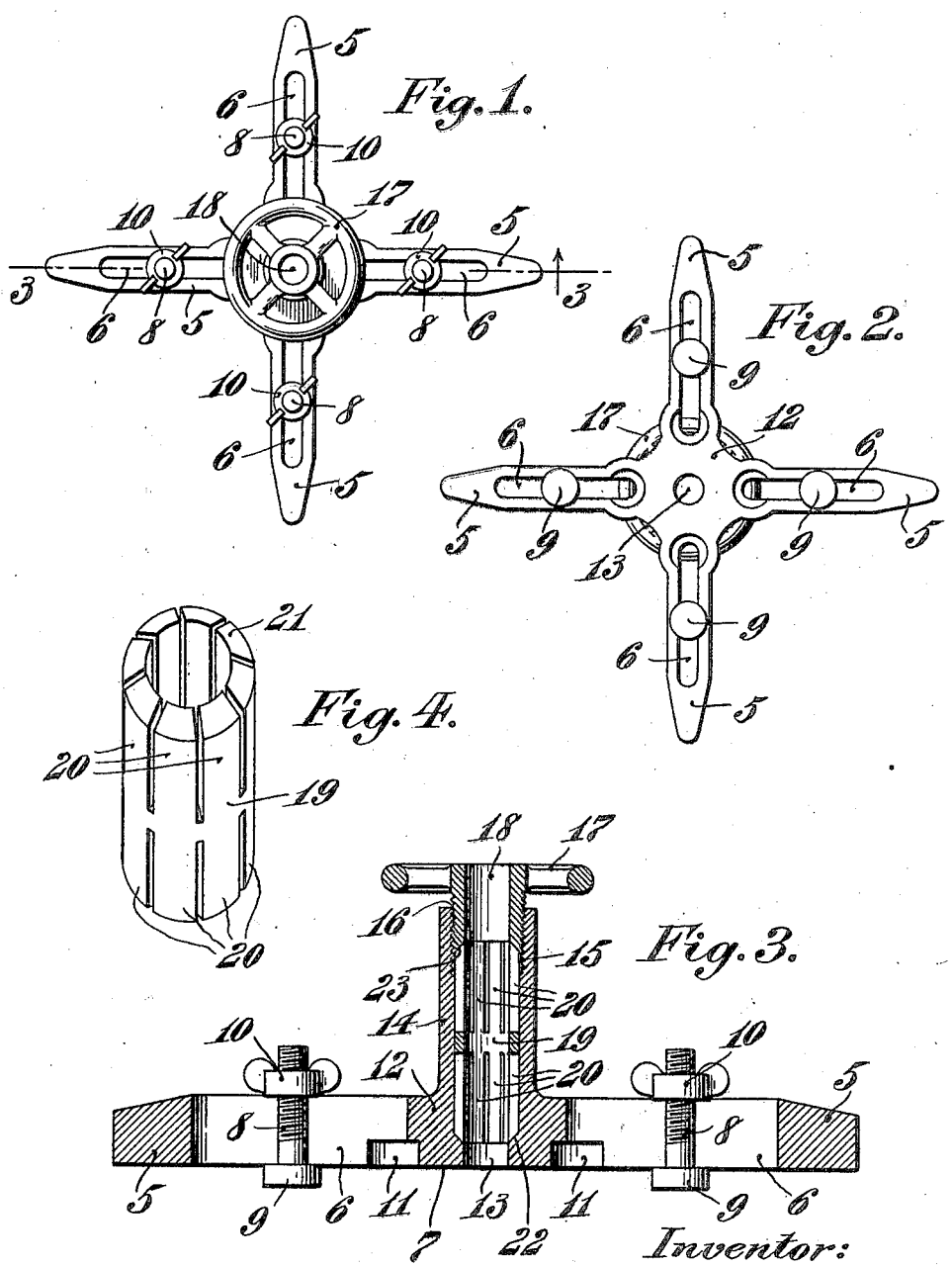

1,449,506

UNITED STATES PATENT OFFICE.

CLARENCE W. FORD, OF PHILADELPHIA, PENNSYLVANIA, ASSIGNOR TO BOSSE-FORD COMPANY, OF ARDEN, DELAWARE, A CORPORATION OF MARYLAND.

GUIDE FIXTURE FOR TEMPLATE RODS.

Application filed June 25, 1918. Serial No. 241,901.

*To all whom it may concern:*

Be it known that I, CLARENCE W. FORD, a citizen of the United States, residing at Philadelphia, in the county of Philadelphia and State of Pennsylvania, have invented certain new and useful Improvements in Guide Fixtures for Template Rods, of which the following is a specification.

My invention relates to guide fixtures for template rods, that is to say, to a device adapted to be used in connection with the common form of template rods used for indicating the shapes to which pipes are to be bent for connection or joining under unusual conditions, such for example as are required in the piping of ships and the like.

It is well known to those skilled in the art that in the piping of ships, and also in other cases where it is required to provide piping having peculiar bends, and where the flanges or other structures to which the piping is to be connected are arranged at various angles, the usual method is to provide rods known as templates (which are usually of about one-half inch in diameter) and these rods are preliminarily bent in position, with the ends adjacent the flanges or other structure to which the pipe is to be connected squared up with a common square, the rod being progressively bent until it conforms to the desired shape with the ends thereof squared to the surface of the flange or other structure to which the pipe is to be joined. The operation of bending the template rod as at present practised is more or less tedious and, unless the operator is very skillful and careful, the pipe which is bent from the template rod as a guide will be more or less inaccurately shaped and joined.

The object therefore of my present invention is to provide a simple and efficient device adapted to be used in connection with a template rod whereby the same may be more readily bent to the required shape with the ends thereof accurately squared and thereby a more perfect result will be assured in the bending of the pipe from the template rod as a guide.

My invention therefore contemplates the provision of fixtures adapted to be mounted on the template rod and adjusted to the opening of the flanges, or other member to which the pipe is to be joined, and which will enable the rods to be properly bent to the required shape by an operator of much less skill than is at present necessary.

The nature and characteristic features of my invention will be more readily understood from the following description taken in connection with the accompanying drawings forming part hereof in which:

Figure 1 is a top or plan view of a device embodying the main features of my present invention;

Fig. 2 is an underneath plan view thereof;

Fig. 3 is an enlarged vertical section thereof taken approximately on the line 3—3 of Fig. 1; and Figure 4 is a perspective view of a clamp member used in the device.

Referring to the drawings, in the particular embodiment of my invention therein shown, the device comprises a plurality of arms 5, each of which is provided with a radial slot 6, and within each slot 6 there is mounted a bolt 8 having a disc like head 9 normally projecting from the underside of each arm 5. The bolts 8 are adapted to be fastened in desired locations in the slots 6 by means of the thumb nuts 10. At the inner end of each slot 6 there is provided, in the underside of the device, a recess 11 so that when desired the heads 9 of the bolts 8 may be retracted in the recesses 11, and the underside of the device will then present a smooth plane surface 7 which is adapted to bear against the surface of the flange or other structure to which the pipe is to be joined, the bolts 8 being properly adjusted in their respective slots whereby the heads 9 thereof will constitute projecting members which are adapted to extend into the opening of the structure to which the pipe is to be joined. These projecting members 9 being properly located as aforesaid will contact with the inner surface of the opening and thereby will serve to positively locate and position the end of the template rod with respect to the opening.

The arms 5 are integrally joined at their inner ends in a solid portion 12 which is traversed by an aperture 13, the axis of which is perpendicular to the plane under surface of the device. Extending upward from the solid central portion 12 is a sleeve 14, the upper end of which is interiorly threaded as at 15 to receive the threaded lower end 16 of a hand nut 17. The hand nut 17 is also provided with a central aperture 18 of the same diameter as that of the aperture 13 and in axial alinement therewith. Mounted within the sleeve 14 is a clamping device 19 which is shown in detached detail in Fig. 4. This device comprises a sleeve slitted at each end to form a plurality of fingers 20 the ends of which are frusto-conically shaped as at 21. This clamping sleeve 19 is mounted within the sleeve 14 in axial alinement with the aperture 18 in the hand nut 17 and the aperture 13 in the base of the device proper, and the lower end of the recess within which the sleeve 19 is mounted is conically shaped as at 22, and similarly the lower end of the hand nut 17 is so shaped complemental to the conical end surfaces of the fingers 20 of the sleeve 19, the arrangement being such that when the hand nut 17 is advanced in its threaded engagement with the upper end of the sleeve 14 the fingers 20 at both ends of the sleeve 19 will be simultaneously constricted so as to effectively clamp the template rod upon which the device is mounted and to maintain the perpendicular relationship of the end of the template rod with respect to the plane surface 7 of the device.

The operation of the device will now be readily understood. One of the devices is mounted upon each end of the template rod and clamped thereto by means of screwing the hand nut 17 to constrict both ends of the sleeve 19 against said template rod. The bolts 8 are then adjusted within the slots 6 so that the heads thereof will form projecting members which serve to position the end of the template rod with respect to the opening of the flange or other structure to which the pipe is to be joined. It will of course be understood that in some instances it may be desired to connect the pipe eccentrically to an opening in the flange or other structure and this can readily be done by an eccentric arrangement of the bolts 8 within their respective slots 6 in the arms 5. For this reason the bolts 8 are independently adjustable in the slots 6.

The template rod may now be bent to the desired shape and it will be advisable to start at one end with the guide fixture at that end securely clamped to the template rod and with the bolt heads 9 positioned in the opening of the flange or other structure to which the pipe is to be joined, after which the template rod is progressively bent to the required shape, and, when the fixture at the other end of the rod properly registers with the opening of the flange or other structure to which the pipe is to be joined at that end, then, when this condition is arrived at, the rod will be properly bent to form a template from which the pipe can be accurately bent and shaped to fit.

It will thus be seen that there is provided a simple and efficient device for facilitating the bending of template rods which will enable the same to be bent more quickly than heretofore, requiring less skill on the part of the operator, and insuring a more accurate result. To those skilled in the art it will be readily understood that the device as shown and above described is adapted to a variety of conditions which are found to exist in practice.

Having thus described the nature and characteristic features of my invention what I claim as new and desire to secure by Letters Patent is:

1. A device of the character described adapted to be mounted upon a template rod to facilitate the accurate bending of the same, said device having a plane bearing surface, and means for clamping the device to the rod with the axis of the rod in true perpendicular relationship to the plane bearing surface, a plurality of members normally projecting from said plane bearing surface, and means for adjustably securing said projecting members at variable distances from the axis of the clamping means.

2. A device of the character described adapted to be mounted upon a template rod to facilitate the accurate bending of the same, said device having a plane bearing surface, and means for clamping the device to the rod with the axis of the rod in true perpendicular relationship to the plane bearing surface, and a plurality of members normally projecting from said plane bearing surface, and said device having recesses permitting the retraction of said members to non-projecting positions when desired.

3. A device of the character described adapted to be mounted upon a template rod to facilitate the accurate bending of the same, said device having a plane bearing surface, and means for clamping the device to the rod with the axis of the rod in true perpendicular relationship to the plane bearing surface, a plurality of members normally projecting from said plane bearing surface, and means for adjustably securing said members at variable distances from the axis of the clamping means, and said device having recesses permitting the retraction of said members to non-projecting positions when desired.

4. A device of the character described adapted to be mounted upon a template rod to facilitate the accurate bending of the same, said device having a plane bearing surface, and means for clamping the device to the rod with the axis of the rod truly perpendicular to the plane bearing surface, and a plurality of bolts adjustably mounted in the device having heads normally projecting beyond said plane bearing surface to provide means for positioning the device adjustable at variable distances from the axis of the clamping means.

5. A device of the character described adapted to be mounted upon a template rod to facilitate the accurate bending of the same, said device having a plane bearing surface, and means for clamping the device to the rod with the axis of the rod truly perpendicular to the plane bearing surface, the device having a plurality of radial slots, bolts adjustably mounted in said slots and having heads normally projecting beyond said plane bearing surface to provide means for positioning the device adjustable at variable distances from the axis of the clamping means.

6. A device of the character described adapted to be mounted upon a template rod to facilitate the accurate bending of the same, said device having a plane bearing surface, and means for clamping the device to the rod with the axis of the rod truly perpendicular to the plane bearing surface, the device having a plurality of radial slots, bolts adjustably mounted in said slots and having heads normally projecting beyond said plane bearing surface to provide means for positioning the device adjustable at variable distances from the axis of the clamping means, and said device having recesses permitting the retraction of the heads of said bolts to non-projecting positions when desired.

7. A device of the character described adapted to be mounted upon a template rod to facilitate the accurate bending of the same, said device having a plane bearing surface, and means for clamping the device to the rod with the axis of the rod truly perpendicular to the plane bearing surface comprising a sleeve longitudinally slitted at each end to provide a plurality of fingers adapted to engage the rod and means for simultaneously constricting the fingers at both ends of said sleeve to thereby clamp the rod, the device having a plurality of radial slots, bolts adjustably mounted in said slots and having heads normally projecting beyond said plane bearing surface to provide means for positioning the device adjustable at variable distances from the axis of the clamping means, and said device having recesses permitting the retraction of the heads of said bolts to non-projecting positions when desired.

In testimony whereof I have hereunto signed my name.

CLARENCE W. FORD.